United States Patent
Ito

(10) Patent No.: US 6,399,738 B1
(45) Date of Patent: Jun. 4, 2002

(54) PROCESS FOR PRODUCING POLYCARBONATE

(75) Inventor: Mitsunori Ito, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/926,233

(22) Filed: Oct. 19, 2001

(30) Foreign Application Priority Data

Apr. 1, 1999 (JP) .......................................... 11-095255

(51) Int. Cl.[7] .............................................. C08G 64/00

(52) U.S. Cl. ....................................... 528/196; 528/198

(58) Field of Search .................................. 528/196, 198

(56) References Cited

U.S. PATENT DOCUMENTS 5,739,258 A   4/1998   Zaby et al.

FOREIGN PATENT DOCUMENTS

JP          4-257546           9/1992

*Primary Examiner*—Terressa Boykin
(74) *Attorney, Agent, or Firm*—Oblon, Spivak, McClelland, Maier & Neustadt, P.C.

(57) ABSTRACT

Provided is a simple and economical method for producing high-quality polycarbonates having a high degree of polymerization and therefore having an increased molecular weight. The method comprises preparing oligocarbonates through oxidative carbonylation of an aromatic hydroxy compound with carbon monoxide and oxygen followed by increasing the molecular weight of the oligocarbonates through transesterification to produce polycarbonates having an increased molecular weight.

5 Claims, No Drawings

PROCESS FOR PRODUCING POLYCARBONATE

TECHNICAL FIELD

The present invention relates to a method for producing polycarbonates. More precisely, it relates to a method for producing polycarbonates from aromatic hydroxy compounds, carbon monoxide and oxygen, which comprises preparing oligocarbonates through oxidative carbonylation of the starting compounds followed by increasing the molecular weight of the resulting oligocarbonates through transesterification to produce polycarbonates having an increased molecular weight.

BACKGROUND ART

Polycarbonates are engineering plastics having good transparency, heat resistance and impact resistance, and are now widely used in the field of producing parts of electric appliances, electronic appliances, automobiles, optical appliances, etc.

In general, two essential methods are known for producing polycarbonates. One comprises directly reacting an aromatic dihydroxy compound such as bisphenol A or the like with phosgene (interfacial polymerization); and the other comprises transesterifying an aromatic dihydroxy compound such as bisphenol A or the like with a dicarbonate such as diphenyl carbonate or the like in a melt, solid or swollen solid phase (melt-phase, solid-phase or swollen solid-phase polymerization). It is known that the polymers have different physical properties, depending on the production method employed for them. The above-mentioned production methods are selectively employed in accordance with the condition for producing the polymers and with the intended use of the polymers.

The interfacial method has many problems in that it requires toxic phosgene, that the chlorine-containing side products (e.g., hydrogen chloride, sodium chloride, etc.) formed corrode the apparatus used and therefore some measures for preventing the corrosion are needed, and that the impurities (e.g., sodium hydroxide, etc.) which have negative influences on the physical properties of the polymers produced are difficult to remove.

On the other hand, for the method of polymerization through transesterification (transesterification method), the starting dicarbonates must be prepared in complicated steps. In addition, including the steps of preparing the starting compounds and the steps of recycling the side products, the method requires a number of reaction steps as a whole and is therefore uneconomical. Accordingly, it is desired to develop a simple method for producing polycarbonates.

Some examples for solving the problems have been proposed. For example, Japanese Patent Laid-Open No. 92731/1980 discloses a method for producing polycarbonates by reacting an aromatic hydroxy compound with carbon monoxide in the presence of a base and a selenium compound. However, this method is problematic in that selenium is seriously toxic and that the reaction is stoichiometric and therefore requires a large amount of selenium or, that is, the method is uneconomical.

Japanese Patent Laid-Open No. 68744/1978 discloses a method for producing aromatic polycarbonates in which is used a palladium catalyst. However, this method is also problematic in that it produces only oligomers having a low degree of polymerization.

The present invention has been made to solve the problems mentioned above, and is to provide a method for producing in which the producing step is short, an economical method for producing high-quality polycarbonates having a high molecular weight.

DISCLOSURE OF THE INVENTION

We, the present inventors have assiduously studied so as to attain the object as above, and, as a result, have found that the above-mentioned problems can be solved by preparing oligomers through oxidative carbonylation followed by increasing the molecular weight of the oligomers through transesterification to produce polycarbonates having an increased molecular weight. On the basis of this finding, we have completed the present invention.

Specifically, the invention provides a method for producing polycarbonates, which comprises preparing oligocarbonates through oxidative carbonylation of an aromatic hydroxy compound with carbon monoxide and oxygen followed by increasing the molecular weight of the oligocarbonates through transesterification to produce polycarbonates having an increased molecular weight.

In this method, it is desirable that the oligocarbonates are crystallized and then their molecular weight is increased through swollen-phase or solid-phase transesterification. If desired, the molecular weight of the oligocarbonates may be increased through melt-phase transesterification.

Preferably, the catalyst for the oxidative carbonylation comprises (a) a palladium compound and (b) a redox compound. Also preferably, the aromatic hydroxy compound is a dihydroxy compound or a mixture of a dihydroxy compound and a monophenol.

BEST MODES OF CARRYING OUT THE INVENTION

The method for producing polycarbonates of the invention comprises <1> a step of preparing oligomers (that is, oligocarbonates) through oxidative carbonylation, and <2> a step of polymerizing the oligocarbonates to produce polycarbonates. The steps are described below.

1. Step of Preparing Oligocarbonates
(1) Starting Materials
(1-1) Aromatic Hydroxy Compound
Examples of the aromatic hydroxy compound are dihydroxy compounds and monophenols mentioned below.
(A) Dihydroxy Compounds
Dihydroxy compounds for use herein are, for example, those of the following general formula (I):

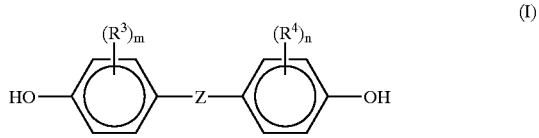

In formula (I), $R^3$ and $R^4$ each represent a halogen atom such as a fluorine, chlorine, bromine or iodine atom, or an alkyl group having from 1 to 8 carbon atoms such as a methyl, ethyl, n-propyl, isopropyl, n-butyl, isobutyl, sec-butyl, t-butyl, pentyl, hexyl, cyclohexyl, heptyl or octyl group. $R^3$ and $R^4$ may be the same or different. Plural $R^3$'s, if any, may be the same or different; and plural $R^4$'s, if any, may be the same or different. m and n each represent an integer of from 0 to 4. Z represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, or a bond of —S—, —SO—, —SO₂—, —O— or —CO—, or a bond of the following formula (II) or (II'):

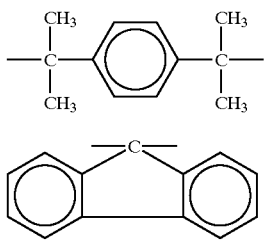

(II)

(II')

The alkylene group having from 1 to 8 carbon atoms and the alkylidene group having from 2 to 8 carbon atoms include, for example, methylene, ethylene, propylene, butylene, pentylene, hexylene, ethylidene and isopropylidene groups. The cycloalkylene group having from 5 to 15 carbon atoms and the cycloalkylidene group having from 5 to 15 carbon atoms include, for example, cyclopentylene, cyclohexylene, cyclopentylidene and cyclohexylidene groups.

The aromatic dihydroxy compounds of formula (I) include, for example, bis(hydroxyaryl)alkanes such as bis(4-hydroxyphenyl)methane, bis(3-methyl-4-hydroxyphenyl)methane, bis(3-chloro-4-hydroxyphenyl)methane, bis(3,5-dibromo-4-hydroxyphenyl)methane, 1,1-bis(4-hydroxyphenyl)ethane, 1,1-bis(2-t-butyl-4-hydroxy-3-methylphenyl)ethane, 1,1-bis(2-t-butyl-4-hydroxy-3-methylphenyl)ethane, 1-phenyl-1,1-bis(3-fluoro-4-hydroxy-3-methylphenyl)ethane, 2,2-bis(4-hydroxyphenyl)propane (generally referred to as bisphenol A), 2,2-bis(3-methyl-4-hydroxyphenyl)propane, 2,2-bis(2-methyl-4-hydroxyphenyl)propane, 2,2-bis(3,5-dimethyl-4-hydroxyphenyl)propane, 1,1-bis(2-t-butyl-4-hydroxy-5-methylphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, 2,2-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 2,2-bis(3-bromo-4-hydroxy-5-chlorophenyl)propane, 2,2-bis(3-phenyl-4-hydroxyphenyl)propane, 2,2-bis(4-hydroxyphenyl)butane, 2,2-bis(3-methyl-4-hydroxyphenyl)butane, 1,1-bis(2-butyl-4-hydroxy-5-methylphenyl)butane, 1,1-bis(2-t-butyl-4-hydroxy-5-methylphenyl)butane, 1,1-bis(2-t-butyl-4-hydroxy-5-methylphenyl)isobutane, 1,1-bis(2-t-amyl-4-hydroxy-5-methylphenyl)butane, 2,2-bis(3,5-dichloro-4-hydroxyphenyl)butane, 2,2-bis(3,5-dibromo-4-hydroxyphenyl)butane, 4,4-bis(4-hydroxyphenyl)heptane, 1,1-bis(2-t-butyl-4-hydroxy-5-methylphenyl)heptane, 2,2-bis(4-hydroxyphenyl)octane, 1,1-(4-hydroxyphenyl)ethane, etc.; bis(hydroxyaryl)cycloalkanes such as 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3-cyclohexyl-4-hydroxyphenyl)cyclohexane, 1,1-bis(3-phenyl-4-hydoxyphenyl)cyclohexane, 1,1-bis(4-hydroxyphenyl)-3,5,5-trimethylcyclohexane, etc.; bis(hydroxyaryl)ethers such as bis(4-hydroxyphenyl) ether, bis(4-hydroxy-3-methylphenyl) ether, etc.; bis(hydroxyaryl)sulfides such as bis(4-hydroxyphenyl)sulfide, bis(3-methyl-4-hydroxyphenyl)sulfide, etc.; bis(hydroxyaryl)sulfoxides such as bis(4-hydroxyphenyl)sulfoxide, bis(3-methyl-4-hydroxyphenyl)sulfoxide, bis(3-phenyl-4-hydroxyphenyl)sulfoxide, etc.; bis(hydroxyaryl)sulfones such as bis(4-hydroxyphenyl)sulfone, bis(3-methyl-4-hydroxyphenyl)sulfone, bis(3-phenyl-4-hydroxyphenyl)sulfone, etc.; dihydroxybiphenyls such as 4,4'-dihydroxybiphenyl, 4,4'-dihydroxy-2,2'-dimethylbiphenyl, 4,4'-dihydroxy-3,3'-dimethylbiphenyl, 4,4'-dihydroxy-3,3'-dicyclohexylbiphenyl, 3,3'-difluoro-4,4'-dihydroxybiphenyl, etc.

Apart from the aromatic dihydroxy compounds of formula (I), also usable herein are dihydroxybenzenes, halogen- and alkyl-substituted dihydroxybenzenes, etc. For example, they are resorcinol, 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, 2,3,4,6-tetrabromoresorcinol, catechol, hydroquinone, 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,5-dichlorohydroquinone, 2,3,5,6-tetramethylhydroquinone, 2,3,4,6-tetra-t-butylhydroquinone, 2,3,5,6-tetrafluorohydroquinone, 2,3,5,6-tetrabromohydroquinone, etc.

(B) Monophenols

Monophenols usable herein are, for example, phenol, o-cresol, m-cresol, p-cresol, o-ethylphenol, m-ethylphenol, p-ethylphenol, o-n-propylphenol, m-n-propylphenol, p-n-propylphenol, o-isopropylphenol, m-isopropylphenol, p-isopropylphenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol, 3,5-dicumylphenol, p-phenylphenol, o,m,p-t-octylphenol, o,m,p-n-octylphenol, etc. One or more of these may be used herein either singly or as combined. Of those, especially preferred are 2,6-di-t-butylphenol, 2,5-di-t-butylphenol, 2,4-di-t-butylphenol, 3,5-di-t-butylphenol, 2,5-dicumylphenol, 3,5-dicumylphenol, p-t-butylphenol, p-cumylphenol, p-t-octylphenol, and p-phenylphenol.

(1-2) Carbon Monoxide

Carbon monoxide to be reacted with the aromatic hydroxy compound may be a single substance of itself, or may be diluted with an inert gas, or may be in the form of a mixed gas with hydrogen.

(1-3) Oxygen

Oxygen to be reacted with the aromatic hydroxy compound may be pure oxygen, but in general, it may be diluted with an inert gas, or may be in the form of an oxygen-containing gas such as air, etc.

(2) Catalyst

The catalyst to be used in the production method of the invention comprises a component (a) and a component (b), as so mentioned hereinabove.

(a) Palladium Compound

The palladium compound for the component (a) may be any and every compound having at least one palladium atom in the compound. Compounds having one palladium atoms are palladium chloride, palladium bromide, palladium iodide, etc. On the other hand, compounds having 2 or more palladium atoms in the compound are, for example, polynuclear metal complexes having 2 or more palladium atoms in one polynuclear metal compound. Examples of such polynuclear metal complexes are
difluorobis[methylenebis(diphenylphosphine)]dipalladium,
dichlorobis[methylenebis(diphenylphosphine)]dipalladium,
dibromobis[methylenebis(diphenylphosphine)]dipalladium,
diiodobis[methylenebis(diphenylphosphine)]dipalladium,
dinitratobis[methylenebis(diphenylphosphine)]dipalladium,
diazidobis[methylenebis(diphenylphosphine)]dipalladium,
diisothiocyanatobis[methylenebis(diphenylphosphine)] dipalladium,
dithiocyanatobis[methylenebis(diphenylphosphine)] dipalladium,
dicyanatobis[methylenebis(diphenylphosphine)] dipalladium,
dichlorobis[methylenebis(diphenylarsine)]dipalladium,
dibromobis[methylenebis(diphenylarsine)]dipalladium,
diiodobis[methylenebis(diphenylarsine)]dipalladium,
dinitratobis[methylenebis(diphenylarsine)]dipalladium,
diazidobis[methylenebis(diphenylarsine)]dipalladium,
diisothiocyanatobis[methylenebis(diphenylarsine)] dipalladium,
dithiocyanatobis[methylenebis(diphenylarsine)] dipalladium,
dicyanatobis[methylenebis(diphenylarsine)]dipalladium,
dichlorobis[methylenebis(diphenylphosphine)]($\mu$-CO) dipalladium,
dinitratobis[methylenebis(diphenylphosphine)]($\mu$-CO) dipalladium,
diazidobis[methylenebis(diphenylphosphine)]($\mu$-CO) dipalladium,
dithiocyanatobis[methylenebis(diphenylphosphine)]($\mu$-CO) dipalladium,
dicyanatobis[methylenebis(diphenylphosphine)]($\mu$-CO) dipalladium,
dichlorobis[methylenebis(diphenylphosphine)]($\mu$-methylisocyanido) dipalladium,
dinitratobis[methylenebis(diphenylphosphine)]($\mu$-methylisocyanido) dipalladium,
diazidobis[methylenebis(diphenylphosphine)]($\mu$-methylisocyanido)dipalladium,
dithiocyanatobis[methylenebis(diphenylphosphine)]($\mu$-methylisocyanido)dipalladium,
dicyanatobis[methylenebis(diphenylphosphine)]($\mu$-methylisocyanido)dipalladium,
dichlorobis[methylenebis(diphenylphosphine)]($\mu$-phenylisocyanido)dipalladium,
dinitratobis[methylenebis(diphenylphosphine)]($\mu$-phenylisocyanido)dipalladium,
diazidobis[methylenebis(diphenylphosphine)]($\mu$-phenylisocyanido)dipalladium,
dithiocyanatobis[methylenebis(diphenylphosphine)]($\mu$-phenylisocyanido)dipalladium,
dicyanatobis[methylenebis(diphenylphosphine)]($\mu$-phenylisocyanido)dipalladium,
tetrakis(triphenylphophine)tripalladium-bis(tetrafluoroborate),
bis(triphenylphosphine)hexa(methylisocyanido) tripalladium-bis(hexafluorophosphate), etc.

For the component (a), one or more of the palladium compounds may be used either singly or as combined. For the palladium complexes, if desired, compounds each having one or more palladium atoms to be their precursors, and polynuclear metal complexes of palladium may be used either singly or in the form of their physical mixtures. Not interfering with the reaction with them, the polynuclear metal complexes may be combined with any other ligands such as alkylphosphines, aromatic phosphines, phosphites, phosphates and the like, and also with nitrile ligands such as acetonitrile and the like.

The palladium compounds for the component (a) may also be palladium complexes with a ligand of an organic compound having at least 2 nitrogen atoms. For these, preferred is at least one selected from palladium complexes with a ligand of a diimine compound, palladium complexes with a ligand of a bipyridyl compound, and palladium complexes with a ligand of a diamine compound.

Concretely, palladium complexes with a ligand of a diimine compound usable herein are those of the following general formula (III):

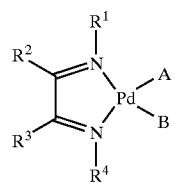

(III)

wherein $R^1$ and $R^4$ each independently represent an aliphatic hydrocarbon group having from 1 to 20 carbon atoms, or an aromatic hydrocarbon group having a hydrocarbon group in its cyclic structure and having from 7 to 20 carbon atoms in total; $R^2$ and $R^3$ each independently represent a hydrogen atom, or a hydrocarbon group having from 1 to 20 carbon atoms; $R^2$ and $R^3$ may bond to each other to form a cyclic structure; and A and B each independently represent a halogen atom, or a hydrocarbon group having from 1 to 20 carbon atoms.

In formula (III), the aliphatic hydrocarbon group having from 1 to 20 carbon atoms for $R^1$ and $R^4$ includes, for example, a linear or branched alkyl group having from 1 to 20 carbon atoms, and a cycloalkyl group having from 3 to 20 carbon atoms, concretely, methyl, ethyl, n-propyl, isopropyl, n-butyl, isobutyl, sec-butyl, tert-butyl, pentyl, hexyl, octyl, decyl, dodecyl, tetradecyl, hexadecyl, octadecyl, cyclopentyl, cyclohexyl and cyclooctyl groups. The cyclic structure of the cycloalkyl group may be substituted, for example, with a lower alkyl group introduced thereinto.

The aromatic group having a hydrocarbon group in its cyclic structure and having from 7 to 20 carbon atoms in total includes, for example, an aromatic group such as phenyl and naphthyl groups, and an aromatic group of which the cyclic structure such as phenyl or naphthyl group is substituted with at least one linear, branched or cyclic alkyl group with 1 to 10 carbon atoms introduced thereinto. For $R^1$ and $R^4$, preferred is the above-mentioned aromatic group having a hydrocarbon group in its cyclic structure, and more preferred is a 2,6-diisopropyl phenyl group. $R^1$ and $R^4$ here may be the same or different.

The hydrocarbon group having from 1 to 20 carbon atoms for $R^2$ and $R^3$ includes, for example, a linear or branched alkyl group having from 1 to 20 carbon atoms, a cycloalkyl group having from 3 to 20 carbon atoms, an aryl group having from 6 to 20 carbon atoms, an aralkyl group having from 7 to 20 carbon atoms. For the linear or branched alkyl group having from 1 to 20 carbon atoms and the cycloalkyl group having from 3 to 20 carbon atoms, referred to are the same examples as those mentioned hereinabove for the aliphatic hydrocarbon group having from 1 to 20 carbon atoms for $R^1$ and $R^4$. The aryl group having from 6 to 20 carbon atoms includes, for example, phenyl, tolyl, xylyl, naphthyl and methylnaphthyl groups; and the aralkyl group having from 7 to 20 carbon atoms includes, for example, benzyl and phenethyl groups. $R^2$ and $R^3$ may be the same or different; and they may bond to each other to form a cyclic structure.

The halogen atom for A and B includes, for example, chlorine, bromine and iodine atoms. For the hydrocarbon group having from 1 to 20 for these, referred to are the same examples as those mentioned hereinabove for the hydrocarbon group having from 1 to 20 carbon atoms for $R^2$ and $R^3$. For A and B, especially preferred are chlorine and bromine atoms. A and B may be the same or different.

Examples of the complexes of formula (III) are the following compounds [1], [2], [3] and [4].

[1]
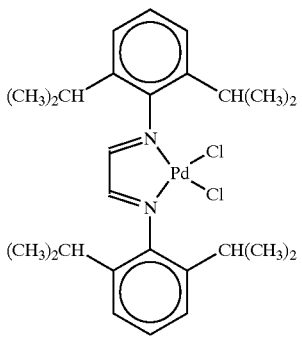

[2]
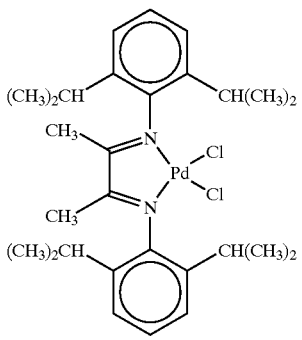

[3]
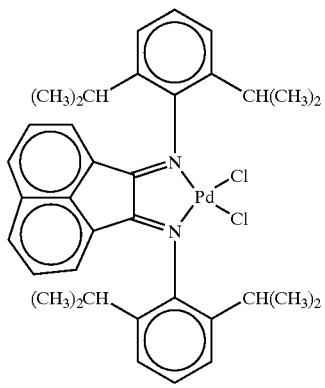

[4]
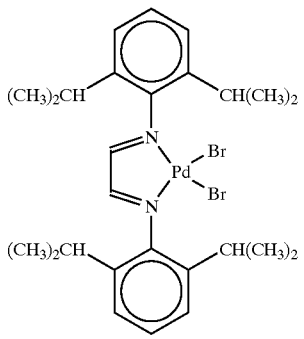

Palladium complexes with a ligand of a bipyridyl compound for the component (a) are concretely those of the following formula (IV):

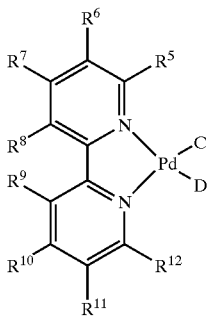

(IV)

wherein $R^5$ to $R^{12}$ each independently represent an aliphatic hydrocarbon group having from 1 to 20 carbon atoms, an aromatic group having a hydrocarbon group in its cyclic structure and having from 7 to 20 carbon atoms, or a hydrogen atom; the neighboring two substituents, such as $R^5$ and $R^6$, $R^6$ and $R^7$, $R^7$ and $R^8$, $R^8$ and $R^9$, $R^9$ and $R^{10}$, $R^{10}$ and $R^{11}$, and $R^{11}$ and $R^{12}$, may bond to each other to form an aromatic ring or an unsaturated aliphatic ring; C and D each independently represent a halogen atom, or a hydrocarbon group having from 1 to 20 carbon atoms.

In formula (IV), the aliphatic hydrocarbon group having from 1 to 20 carbon atoms for $R^5$ to $R^{12}$ includes, for example, a linear or branched alkyl group having from 1 to 20 carbon atoms, and a cycloalkyl group having from 3 to 20 carbon atoms, concretely, methyl, ethyl, n-propyl, isopropyl, n-butyl, isobutyl, sec-butyl, tert-butyl, pentyl, hexyl, octyl, decyl, dodecyl, tetradecyl, hexadecyl, octadecyl, cyclopentyl, cyclohexyl and cyclooctyl groups. The cyclic structure of the cycloalkyl group may be substituted, for example, with a lower alkyl group introduced thereinto. The aromatic group having a hydrocarbon group in its cyclic structure and having from 7 to 20 carbon atoms in total includes, for example, an aromatic group such as phenyl and naphthyl groups, and an aromatic group of which the cyclic structure such as phenyl or naphthyl group is substituted with at least one linear, branched or cyclic alkyl group with 1 to 10 carbon atoms introduced thereinto.

$R^5$ to $R^{12}$ may be the same or different. The neighboring groups of $R^5$ to $R^{12}$ may bond to each other to form an aromatic ring or an unsaturated aliphatic ring. The halogen atom for C and D includes, for example, chlorine, bromine and iodine atoms. For the hydrocarbon group having from 1 to 20 for these, referred to are the same examples as those mentioned hereinabove for the hydrocarbon group having from 1 to 20 carbon atoms for $R^5$ to $R^{12}$. For C and D, especially preferred are chlorine and bromine atoms. C and D may be the same or different.

Examples of the complexes of formula (IV) are (2,2'-biquinolyl)palladium dichloride, (2,2'-bipyridyl)palladium dichloride, (1,10-phenanthrolyl)palladium dichloride, (2,2'-biquinolyl)palladium dibromide, (2,2'-bipyridyl)palladium dibromide, (1,10-phenanthrolyl)palladium dibromide, (2,2'-biquinolyl)palladium diiodide, (2,2'-bipyridyl)palladium diiodide, (1,10-phenanthrolyl)palladium diiodide. Of the palladium complexes with a ligand of a bipyridyl compound, especially preferred are (2,2'-biquinolyl)palladium dichloride and (2,2'-biquinolyl)palladium dibromide.

Palladium complexes with a ligand of a diamine compound usable herein are concretely those of the following formula (V):

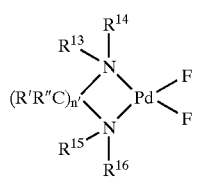

wherein n' indicates an integer of from 1 to 10; $R^{13}$ to $R^{16}$ each independently represent an aliphatic group having from 1 to 20 carbon atoms, an aromatic group having a hydrocarbon group in its cyclic structure and having from 7 to 20 carbon atoms in total, or a hydrogen atom; the substituents on the same nitrogen atom, such as $R^{13}$ and $R^{14}$, and $R^{15}$ and $R^{16}$, may bond to each other to form a saturated aliphatic ring or an unsaturated aliphatic ring; R' and R" each independently represent an aliphatic hydrocarbon group having from 1 to 20 carbon atoms, an aromatic group having a hydrocarbon group in its cyclic structure and having from 7 to 20 carbon atoms in total, or a hydrogen atom, and they may bond to each other to form a saturated aliphatic ring or an unsaturated aliphatic ring; plural R's, if any, may be the same or different, and plural R"s, if any, may be the same or different; E and F each independently represent a halogen atom, or a hydrocarbon group having from 1 to 20 carbon atoms.

In formula (V), the aliphatic hydrocarbon group having from 1 to 20 carbon atoms for $R^{13}$ to $R^{16}$ includes, for example, a linear or branched alkyl group having from 1 to20 carbon atoms, and a cycloalkyl group having from 3 to 20 carbon atoms, concretely, methyl, ethyl, n-propyl, isopropyl, n-butyl, isobutyl, sec-butyl, tert-butyl, pentyl, hexyl, octyl, decyl, dodecyl, tetradecyl, hexadecyl, octadecyl, cyclopentyl, cyclohexyl and cyclooctyl groups. The cyclic structure of the cycloalkyl group may be substituted, for example, with a lower alkyl group introduced thereinto. The aromatic group having a hydrocarbon group in its cyclic structure and having from 7 to 20 carbon atoms in total includes, for example, an aromatic group such as phenyl and naphthyl groups, and an aromatic group of which the cyclic structure such as phenyl or naphthyl group is substituted with at least one linear, branched or cyclic alkyl group with 1 to 10 carbon atoms introduced thereinto.

$R^{13}$ to $R^{16}$ may be the same or different. Of the substituents of $R^{13}$ to $R^{16}$, those on the same nitrogen atom may bond to each other to form a saturated aliphatic ring or an unsaturated aliphatic ring.

R' and R" each independently represent an aliphatic hydrocarbon group having from 1 to 20 carbon atoms, an aromatic group having a hydrocarbon group in its cyclic structure and having from 7 to 20 carbon atoms in total, or a hydrogen atom, and they may bond to each other to form a saturated aliphatic ring or an unsaturated aliphatic ring. Plural R's, if any, may be the same or different, and plural R"s, if any, may be the same or different. For the hydrocarbon group having from 1 to 20 for these and for the aromatic group having a hydrocarbon group in its cyclic structure and having from 7 to 20 carbon atoms in total, referred to are the same examples as those mentioned hereinabove for $R^{13}$ to $R^{16}$.

The halogen atom for E and F includes, for example, chlorine, bromine and iodine atoms. For the hydrocarbon group having from 1 to 20 carbon atoms for these, referred to are the same examples as those mentioned hereinabove for the hydrocarbon group having from 1 to 20 carbon atoms for $R^{13}$ to $R^{16}$. For E and F, especially preferred are chlorine and bromine atoms. E and F may be the same or different.

Examples of the complexes of formula (V) are (N,N,N',N'-tetramethylethylenediamine)palladium dichloride, (ethylenediamine)palladium dichloride, (N,N,N',N'-tetramethylmethylenediamine)palladium dichloride, (methylenediamine)palladium dichloride, (N,N,N',N'-tetramethylethylenediamine)palladium dibromide, (ethylenediamine)palladium dibromide, (N,N,N',N'-tetramethylmethylenediamine)palladium dibromide, (methylenediamine)palladium dibromide. Of the palladium complexes with a ligand of a diamine compound, especially preferred are (ethylenediamine)palladium dichloride, (N,N,N',N'-tetramethylethylenediamine)palladium dichloride, and (N,N,N',N'-tetramethylmethylenediamine)palladium dichloride.

For the component (a) for use in the invention, one or more of the above-mentioned palladium complexes may be used either singly or as combined. Also usable are palladium compounds that are the precursors to form the complexes, along with the ligands for them. Not interfering with the reaction, the palladium compounds may be combined with any other ligands such as alkylphosphines, aromatic phosphines, phosphites, phosphates and the like, and also with nitrile ligands such as acetonitrile and the like.

(b) Redox Compound

The redox catalyst for the component (b) may be at least one selected from lanthanoid compounds, transition metal compounds of Group V of the Periodic Table, transition metal compounds of Group VI thereof, transition metal compounds of Group VII thereof, iron compounds, cobalt compounds, nickel compounds and copper compounds, which may be in any form of organic complexes, organic salts and inorganic salts. Concretely, they are cerium compounds, vanadium compounds, chromium compounds, manganese compounds, iron compounds, cobalt compounds and copper compounds. Preferred are cerium compounds and manganese compounds. Concretely, one preferred compound is cerium acetate. Especially preferred is cerium acetate monohydrate.

Especially preferred examples of the redox catalyst for use herein are $Ce(TMHD)_4$, $Mn(TMHD)_3$, $Ce(Trop)_4$ and $Mn(Trop)_3$ (in which TMHD means 2,2,6,6-tetramethyl-3,5-heptanedionate ion, and Trop means tropolonate ion), and also cerium acetate monohydrate.

In the production method of the invention, the amount of the catalyst to be used is not specifically defined, and may be any ordinary catalytic amount. For example, the amount of the component (a) to be used may fall between $1\times10^{-8}$ and 0.5 mols, but preferably between $1\times10^{-6}$ and $1\times10^{-2}$ mols, in terms of palladium relative to one mol of the starting aromatic hydroxy compound. If the amount of the component (a) used is smaller than $1\times 10^{-8}$ mols, the reaction speed will be low and is not practicable. On the other hand, even if the amount is larger than 0.5 mols, it does not produce any better results but is rather uneconomical.

The amount of the component (b) to be used may fall generally between 0.1 and 100 mols, but preferably between 0.5 and 50 mols, relative to one mol of palladium of the component (a). If the amount of the component (b) used is smaller than 0.1 mols, the reaction speed will be low and is not practicable; but if larger than 100 mols, it is uneconomical since the aromatic carbonates produced will be oxidatively decomposed by the component (b).

(3) Co-catalyst

To the catalyst comprising the components (a) and (b) for use in the method of the invention, optionally added is a suitable amount of a co-catalyst such as an onium halide compound. Examples of the onium halide compound are compounds of the following formula (VI):

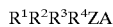  (VI)

wherein Z represents a nitrogen atom or a phosphorus atom; A represents a halogen atom such as fluorine, chlorine, bromine or iodine atom; $R^1$ to $R^4$ each represent an alkyl group having from 1 to 8 carbon atoms, or an aryl group having from 6 to 12 carbon atoms, concretely including methyl, ethyl, propyl, butyl, pentyl, hexyl, octyl, cyclohexyl, phenyl, tolyl, xylyl and naphthyl groups; $R^1$ to $R^4$ may be the same or different; and $R^1$ and $R^2$, $R^3$ and $R^4$ may bond to each other to form a divalent group of —$(CH_2)_n$— with n indicating an integer of from 2 to 7.

In addition to the compounds of formula (VI), also usable are other onium halides such as bis(triphenylphosphoranylidene)ammonium halides. Their examples are tetra-n-butylammonium bromide, tetraphenylphosphonium bromide, and bis(triphenylphosphoranylidene)ammonium bromide.

(4) Solvent

In the production method of the invention, the oligomerization goes on in the presence or absence of a solvent. In general, the reaction is preferably effected in the absence of a solvent, as being economical. However, if the process for it requires a solvent, the reaction may be effected in the presence of a solvent. The solvent includes, for example, aliphatic hydrocarbons, cycloaliphatic hydrocarbons, halogenohydrocarbons, ethers, esters, nitrogen-containing solvents, sulfur-containing solvents. Depending on the type and the composition of the catalyst to be used in the production method, a suitable solvent may be selected and used.

(5) Step of Forming Oligomer (Oligocarbonate)

In the step of forming an oligocarbonate in the production method of the invention, the reaction temperature is not specifically defined, but generally falls between 50 and 200° C., preferably between 70 and 150° C. If the reaction temperature is too high, overstepping the defined range, side reaction such as decomposition will increase; but if too low below the defined range, the reaction speed is low and is impracticable. The reaction pressure is generally elevated, as gaseous materials of carbon monoxide and oxygen are used in the method. The carbon monoxide partial pressure may fall between $1\times 10^{-2}$ and 20 MPa, preferably between $1\times 10^{-2}$ and 10 MPa; and the oxygen partial pressure may fall between $1\times 10^{-2}$ and 10 MPa, preferably between $1\times 10^{-2}$ and 5 MPa. In particular, the oxygen partial pressure is preferably so controlled that the gaseous composition in the reaction system is not within an explosive range. If the reaction pressure is too low, however, the reaction speed will be low; but if too high, a large-scale apparatus is needed and it is expensive and uneconomical. In case where inert gas and hydrogen are used in the method, their partial pressure is not specifically defined but may be defined to fall within a practicable range.

For the reaction, employable is a batch process, a semi-continuous process or a continuous process. The condition of the reaction system is any of a liquid phase, a mixture of a liquid phase and a vapor phase, or a mixture of a liquid phase, a vapor phase and a solid phase. Regarding its condition in the reaction system, the catalyst may be uniform or non-uniform. Depending on its type, the condition of the catalyst may be suitably determined. If desired, the starting components and the catalyst may be diluted. The diluent may be an inert solvent such as saturated hydrocarbons or the like to form a liquid phase of the reaction system; but may be an inert gas such as nitrogen, argon, ethane, propane or the like to form a vapor phase thereof.

2. Step of Polymerizing Oligocarbonate to Produce Polycarbonate

In the method of producing polycarbonates of the invention, the oligocarbonate prepared in the manner as above is directly polymerized in a melt state or in a thin-film melt state; or the oligocarbonate is crystallized and then polymerized in a swollen state or in a solid-phase state.

(1) Comonomer

To the oligocarbonate prepared in the previous step <1>, optionally added is any comonomer. The comonomer includes, for example, dihydroxy compounds, monophenols, dicarbonates, aliphatic diols, dicarboxylic acids, siloxanes and branching agents.

The dihydroxy compounds include, for example, bis(hydroxyaryl)alkanes such as bis(4-hydroxyphenyl)methane, bis(3-methyl-4-hydroxyphenyl)methane, bis(3-chloro-4-hydroxyphenyl)methane, bis(3,5-dibromo-4-hydroxyphenyl)methane, 1,1-bis(4-hydroxyphenyl)ethane, 1,1-bis(2-t-butyl-4-hydroxy-3-methylphenyl)ethane, 1,1-bis(2-t-butyl-4-hydroxy-3-methylphenyl)ethane, 1-phenyl-1,1-bis(3-fluoro-4-hydroxy-3-methylphenyl)ethane, 2,2-bis(4-hydroxyphenyl)propane (generally referred to as bisphenol A), 2,2-bis(3-methyl-4-hydroxyphenyl)propane, 2,2-bis(2-methyl-4-hydroxyphenyl)propane, 2,2-bis(3,5-dimethyl-4-hydroxyphenyl)propane, 1,1-bis(2-t-butyl-4-hydroxy-5-methylphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, 2,2-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 2,2-bis(3-bromo-4-hydroxy-5-chlorophenyl)propane, 2,2-bis(3-phenyl-4-hydroxyphenyl)propane, 2,2-bis(4-hydroxyphenyl)butane, 2,2-bis(3-methyl-4-hydroxyphenyl)butane, 1,1-bis(2-butyl-4-hydroxy-5-methylphenyl)butane, 1,1-bis(2-t-butyl-4-hydroxy-5-methylphenyl)butane, 1,1-bis(2-t-butyl-4-hydroxy-5-methylphenyl)isobutane, 1,1-bis(2-t-amyl-4-hydroxy-5-methylphenyl)butane, 2,2-bis(3,5-dichloro-4-hydroxyphenyl)butane, 2,2-bis(3,5-dibromo-4-hydroxyphenyl)butane, 4,4-bis(4-hydroxyphenyl)heptane, 1,1-bis(2-t-butyl-4-hydroxy-5-methylphenyl)heptane, 2,2-bis(4-hydroxyphenyl)octane, 1,1-(4-hydroxyphenyl)ethane, etc.; bis(hydroxyaryl)cycloalkanes such as 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3-cyclohexyl-4-hydroxyphenyl)cyclohexane, 1,1-bis(3-phenyl-4-hydoxyphenyl)cyclohexane, 1,1-bis(4-hydroxyphenyl)-3,5,5-trimethylcyclohexane, etc.; bis(hydroxyaryl)ethers such as bis(4-hydroxyphenyl)ether, bis(4-hydroxy-3-methylphenyl)ether, etc.; bis(hydroxyaryl)sulfides such as bis(4-hydroxyphenyl)sulfide, bis(3-methyl-4-hydroxyphenyl)sulfide, etc.; bis(hydroxyaryl)sulfoxides such as bis(4-hydroxyphenyl)sulfoxide, bis(3-methyl-4-hydroxyphenyl)sulfoxide, bis(3-phenyl-4-hydroxyphenyl)sulfoxide, etc.; bis(hydroxyaryl)sulfones such as bis(4-hydroxyphenyl)sulfone, bis(3-methyl-4-hydroxyphenyl)sulfone, bis(3-phenyl-4-hydroxyphenyl)sulfone, etc.; dihydroxybiphenyls such as 4,4'-dihydroxybiphenyl, 4,4'-dihydroxy-2,2'-dimethylbiphenyl, 4,4'-dihydroxy-3,3'-dimethylbiphenyl, 4,4'-dihydroxy-3,3'-dicyclohexylbiphenyl, 3,3'-difluoro-4,4'-dihydroxybiphenyl, etc.; dihydroxybenzenes, halogen- and alkyl-substituted dihydroxybenzenes, such as resorcinol, 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, 2,3,4,6-tetrabromoresorcinol, catechol, hydroquinone, 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,5-dichlorohydroquinone, 2,3,5,6-tetramethylhydroquinone, 2,3,4,6-tetra-t-butylhydroquinone, 2,3,5,6-tetrafluorohydroquinone, 2,3,5,6-tetrabromohydroquinone, etc.

The monophenols include, for example, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol, 3,5-dicumylphenol, p-phenylphenol, o,m,p-t-octylphenol, o,m,p-n-octylphenol, etc. One or more of these may be used herein either singly or as combined. Of those, especially preferred are 2,6-di-t-butylphenol, 2,5-di-t-butylphenol, 2,4-di-t-butylphenol, 3,5-di-t-butylphenol, 2,5-dicumylphenol, 3,5-dicumylphenol, p-t-butylphenol, p-cumylphenol, p-t-octylphenol, and p-phenylphenol.

The dicarbonates include, for example, diphenyl carbonate, ditolyl carbonate, bis(chlorophenyl)carbonate, di-m-cresyl carbonate, dinaphthyl carbonate, bis(diphenyl) carbonate, bisphenol A bisphenylcarbonate, dibutyl carbonate, dicyclohexyl carbonate, methylphenyl carbonate, di-tert-butyl carbonate, di-tert-butylphenyl carbonate, dicumyl carbonate, di-tert-octyl carbonate, bisphenol A bismethylcarbonate, etc. Especially preferred are diphenyl carbonate, di-tert-butyl carbonate, and dicumyl carbonate.

The aliphatic dihydroxy compounds include, for example, butane-1,4-diol, 2,2-dimethylpropane-1,3-diol, hexane-1,6-diol, dieathylene glycol, triethylene glycol, tetraethylene glycol, octaethylene glycol, dipropylene glycol, N,N-methyldiel hanolamine, cyclohexane-1,3-diol, cyclohexane-1,4-diol, 1,4-dimethylolcyclohexane, p-xylylene glycol, 2,2-bis(4-hydroxycyclohexyl)-propane, as well as dialcohol or diphenol ethoxides and propoxides, such as bisoxyethyl-bisphenol A, bisoxyethyl-tetrachlorobisphenol A, bisoxyethyl-tetrachlorohydroquinone, etc.

The dicarboxylic acids include, for example, terephthalic acid, isophthalic acid, sebacic acid, decane-diacid, dodecane-diacid, diphenyl terephthalate, diphenyl isophthalate, diphenyl sebacate, diphenyl decanedicarboxylate, diphenyl dodecanedicarboxylate, etc.

The polyorganosiloxanes for use herein are those of which both terminals of the polysiloxane skeleton are blocked with a hydroxyl group (of the following formula (VII), and those of which one terminal of the polysiloxane skeleton is blocked with an alkylcarbonate or arylalkylcarbonate group (of the following formula (VIII).

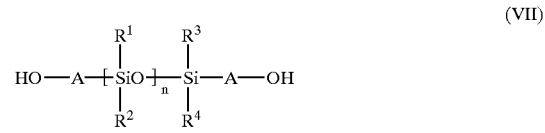

(VII)

wherein $R^1$ to $R^4$ each represent an alkyl group having from 1 to 8 carbon atoms (e.g., methyl, ethyl, propyl, n-butyl, isobutyl, amyl, isoamyl, hexyl, etc.), or an aryl group having from 6 to 20, preferably from 6 to 18 carbon atoms (e.g., phenyl, tolyl, xylyl, naphthyl, etc.), and these may be the same or different; A represents an aliphatic or aromatic, divalent organic residue (e.g., methylene, ethylene, propylene, butylene, pentylene, hexylene, ethylidene, isopropylidene, cyclopentylene, cyclohexylene, cyclopentylidene, cyclohexylidene, as well as o-allylphenol residue, p-vinylphenol residue, eugenol residue, bisphenol A residue, etc.); and n falls between 1 and 500.

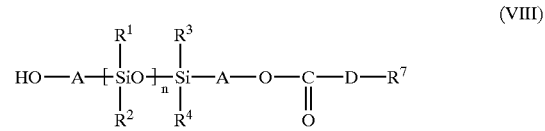

(VIII)

wherein $R^1$ to $R^4$, A and n have the same meanings as in formula (VII); D represents a single bond or a bond of —O—; $R^7$ represents an alkyl group having from 1 to 20 carbon atoms, or an arylalkyl group having from 7 to 20 carbon atoms.

Concretely, the polysiloxane group includes polydimethylsiloxane, polydiethylsiloxane, polydiphenylsiloxane, polymethylphenylsiloxane, etc.

One or more such polyorganosiloxanes can be suitably selected and used in the invention, and they are effective for improving the flame retardancy and the flowability of polycarbonates.

For the branching agent, herein usable are poly-functional organic compounds having at least three functional groups. Concretely, they have at least three functional groups of hydroxyl groups, carboxyl groups, amino groups, imino groups, formyl groups, acid halide groups, haloformate groups and the like in one molecule, including, for example, phloroglucinol, mellitic acid, trimellitic acid, trimellitic acid chloride, trimellitic acid anhydride, gallic acid, n-propyl gallate, protocatechuic acid, pyromellitic acid, pyromellitic acid secondary anhydride, α-resorcylic acid, β-resorcylic acid, resorcylaldehyde, trimellithyl chloride, trimellithyl trichloride, 4-chloroformylphthalic acid anhydride, benzophenone-tetracarboxylic acid, 2,4,4'-trihydroxybenzophenone, 2,2',4,4'-tetrahydroxybenzophenone, 2,4,4'-trihydroxyphenyl ether, 2,2',4,4'-tetrahydroxyphenyl ether, 2,4,4'-trihydroxydiphenyl-2-propane, 2,2'-bis(2,4-dihydroxy propane, 2,2',4,4'-tetrahydroxydiphenylmethane, 2,4,4'-trihydroxydiphenylmethane, 1-[α-methyl-α-(4'-hydroxyphenyl)ethyl]-4-[α',α'-bis(4''-hydroxyphenyl)ethyl]benzene, α,α',α''-tris(4-hydroxyphenyl)-1,3,5-triisopropylbenzene, 2,6-bis(2'-hydroxy-5'-methylbenzyl)-4-methylphenol, 4,6-dimethyl-2,4,6-tris(4'-hydroxyphenyl)-heptene-2,4,6-dimethyl-2,4,6-dimethyl-tris(4-hydroxyphenyl)-heptane-2,1,3,5-tris(4-hydroxyphenyl)benzene, 1,1,1-tris(4-hydroxyphenyl)ethane, 1,1,1-tris(4'-hydroxyphenyl)ethane, 1,1,1-tris(4-hydroxy-3-methylphenyl)ethane, 1,1,1-tris(4-hydroxy-3,5-dimethylphenyl)ethane, 1,1,1-tris(3-chloro-4-hydroxyphenyl)ethane, 1,1,1-tris(3,5-dichloro-4-hydroxyphenyl)ethane, 1,1,1-tris(3-bromo-4-hydroxyphenyl)ethane, 1,1,1-tris(3,5-dibromo-4-hydroxyphenyl)ethane, 2,2-bis[4,4-bis(4'-hydroxyphenyl)cyclohexyl]-propane, 2,6-bis(2'-hydroxy-5'-isopropylbenzyl)-4-isopropylphenol, bis[2-hydroxy-3-(2'-hydroxy-5'-methylbenzyl)-5-methylphenyl]methane, bis[2-hydroxy-3-(2'-hydroxy-5'-isopropylbenzyl)-5-methylphenyl]methane, tetrakis(4-hydroxyphenyl)methane, tris(4-hydroxyphenyl)phenylmethane, tris(4-hydroxyphenyl)phenylmethane, tris(4-hydroxy-3-methylphenyl)methane, tris(4-hydroxyphenyl-3,5-dimethylphenyl)methane, tris(3-chloro-4-hydroxyphenyl)methane, tris(3-bromo-4-hydroxyphenyl)methane, tris(3,5-dibromo-4-hydroxyphenyl)methane, 2',4,7-trihydroxyflavan, 2,4,4-trimethyl-2',4'-dihydroxyphenylisopropyl)benzene, tris(4'-hydroxyaryl)-amyl-s-triazine, 1-[α-methyl-α-(4'-hydroxyphenyl)ethyl]-3-[α',α'-bis(4''-hydroxyphenyl)ethyl]benzene, isatin-bis(o-cresol), α,α,α',α'-tetrakis(4-hydroxyphenyl)-p-xylene, α,α,α',α'-tetrakis(3-methyl-4-hydroxyphenyl)-p-xylene, α,α,α',α'-tetrakis(2-methyl-4-hydroxyphenyl)-p-xylene, α,α,α',α'-tetrakis(2,5-dimethyl-4-hydroxyphenyl)-p-xylene, α,α,α',α'-tetrakis(2,6-dimethyl-4-hydroxyphenyl)-p-xylene, α,α'-dimethyl-α,α,α',α'-tetrakis (4-hydroxyphenyl)-p-xylene, etc. One or more of these branching agents may be used either singly or as combined.

Of those, especially preferred are 1,1,1-tris(4-hydroxyphenyl)ethane, 1,1,1-tris(4-hydroxy-3-methylphenyl)ethane, 1,1,1-tris(4-hydroxy-3,5-dimethylphenyl)ethane, 1,1,1-tris(3-chloro-4-hydroxyphenyl)ethane, 1,1,1-tris(3,5-dichloro-4-hydroxyphenyl)ethane, 1,1,1-tris(3-bromo-4-hydroxyphenyl)ethane, 1,1,1-tris(3,5-dibromo-4-hydroxyphenyl)ethane, tris(4-hydroxyphenyl)methane, tris(4-hydroxy-3-methylphenyl)methane, tris(4-hydroxyphenyl-3,5-dimethylphenyl)methane, tris(3-chloro-4-hydroxyphenyl)methane, tris(3-bromo-4-hydroxyphenyl)methane, tris(3,5-dibromo-4-hydroxyphenyl)methane, α,α'-dimethyl-α,α,α',α'-tetrakis(4-hydroxyphenyl)-p-xylene, etc.

(2) Antioxidant

If desired, an antioxidant may be added to the oligocarbonates prepared in the previous step <1>. Also if desired, it may be added to polycarbonates obtained after polymerization.

Preferred are phosphorus-containing antioxidants for use herein, including, for example, trialkyl phosphites, tricycloalkyl phosphites, triaryl phosphites, monoalkyldiaryl phosphites, trialkyl phosphates, tricycloalkyl phosphates, triaryl phosphates, etc.

(3) Catalyst

The catalyst to be used in polymerizing the oligocarbonates is not specifically defined, including, for example, quaternary phosphonium salts, and also alkali metal compounds and alkaline earth metal compounds such as sodium hydroxide, calcium hydroxide and the like, as well as transition metal compounds, and compounds of Group IIIa, IVa or Va such as tin, antimony or the like that are generally used in the art.

Various quaternary phosphonium salts are usable herein. For example, preferably used are compounds of the following general formulae (IX) and (X):

In formulae (IX) and (X), $R^{12}$ represents an organic group. The organic group includes, for example, an alkyl or cycloalkyl group such as a methyl, ethyl, propyl, butyl, pentyl, hexyl, octyl or cyclohexyl group; an aryl group such as a phenyl, tolyl, naphthyl or biphenyl group; and an arylalkyl group such as a benzyl group. Four $R^{12}$'s may be the same or different, or two of them may bond to each other to form a cyclic structure. $X^2$ represents a group capable of forming a mono-valent anion, such as a halogen atom, a hydroxyl group, an alkyloxy group, an aryloxy group, R'COO, $HCO_3$, $(R'O)_2P(=O)O$, $BR''_4$ or the like. In those, R' represents a hydrocarbon group such as an alkyl group, an aryl group or the like, and two (R'O)s may be the same or different. R'' represents a hydrogen atom, or a hydrocarbon group such as an alkyl group, an aryl group or the like, and four R''s may be the same or different. $Y^1$ represents a group capable of forming a di-valent anion, such as $CO_3$ or the like.

The quaternary phosphonium salts include, for example, tetra(aryl or alkyl)phosphonium hydroxides such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, tetrabutylphosphonium hydroxide, etc.; as well as tetramethylphosphonium tetraphenyl borate, tetraphenylphosphonium bromide, tetraphenylphosphonium phenolate, tetraphenylphosphonium tetraphenyl borate, methyltriphenylphosphonium tetraphenyl borate, benzyltriphenylphosphonium tetraphenyl borate, biphenyltriphenylphosphonium tetraphenyl borate, tetratolylphosphonium tetraphenyl borate, tetraphenylphosphonium phenolate, tetra(p-t-butylphenyl)phosphonium diphenyl phosphate, triphenylbutylphosphonium phenolate, triphenylbutylphosphonium tetraphenyl borate, etc.

Of the quaternary phosphonium salts mentioned above, preferred are those having alkyl groups, since they have high catalytic activity and since they are easily pyrolyzed and remain little in the polymers produced. Concretely, preferred are tetramethylphosphonium methyltriphenyl borate, tetraethylphosphonium ethyltriphenyl borate, tetrapropylphosphonium propyltriphenyl borate, tetrabutylphosphonium butyltriphenyl borate, tetrabutylphosphonium tetraphenylborate, tetraethylphosphonium tetraphenyl borate, trimethylethylphosphonium trimethylphenyl borate, trimethylbenzylphosphonium benzyltriphenyl borate, etc.

Tetraalkylphosphonium salts such as tetramethylphosphonium hydroxide, tetraethylphosphonium hydroxide, tetrabutylphosphonium hydroxide and the like are readily decomposed, as having a relatively low decomposition point. Therefore, when used herein, they leave few impurities in the products, polycarbonates. In addition, since the number of carbon atoms constituting them is small, their basic amount to be used in producing polycarbonates can be reduced. Therefore, using them is preferred in point of the production costs.

Apart from the compounds of formulae (IX) and (X), also usable herein are bis-tetraphenylphosphonium 2,2-bis(4-hydroxyphenyl)propane, ethylenebis(triphenylphosphonium)dibromide, trimethylenebis(triphenylphosphonium)bis(tetraphenyl borate), etc.

Further usable herein are quaternary phosphonium salts having aryl and/or branched alkyl groups. For example, usable are compounds of the following general formulae (XI) and (XII).

  (XI)

  (XII)

In formulae (XI) and (XII);

n represents an integer of from 1 to 4.

$R^{13}$ represents at least one selected from an aryl group and a branched alkyl group. The branched alkyl group has a structure of $R_3C-$, in which R represents at least one selected from a hydrogen atom, an alkyl group, a substituted alkyl group, an aryl group, and a substituted aryl group, and at least two of the three R's may bond to each other to form a cyclic structure. In this, however, two R's must not be hydrogens at the same time. For example, it is a cycloalkyl group, a branched alkyl group such as an isopropyl or tert-butyl group, or an arylalkyl group such as a benzyl group. When n is 2 or more, plural R's may be the same or different.

$R^{14}$ represents an alkyl group, a substituted alkyl group, an aryl group, or a substituted aryl group.

$X^2$ represents a group capable of forming a mono-valent anion, such as a halogen atom, a hydroxyl group, an alkyloxy group, an aryloxy group, R'COO, $HCO_3$, $(R'O)_2P(=O)$O, $BR''_4$ or the like. In those, R' represents a hydrocarbon group such as an alkyl group, an aryl group or the like, and two (R'O)s may be the same or different. R" represents a hydrogen atom, or a hydrocarbon group such as an alkyl group, an aryl group or the like, and four R"s may be the same or different.

$Y^1$ represents a group capable of forming a di-valent anion, such as $CO_3$ or the like.

The quaternary phosphonium salts include, for example, the following:

Tetra(aryl or alkyl)phosphonium hydroxides, such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetrahexylphosphonium hydroxide, etc.;

Mono(aryl or alkyl)triphenylphosphonium hydroxides, such as methyltriphenylphosphonium hydroxide, ethyltriphenylphosphonium hydroxide, propyltriphenylphosphonium hydroxide, butyltriphenylphosphonium hydroxide, octyltriphenylphosphonium hydroxide, tetradecyltriphenylphosphonium hydroxide, benzyltriphenylphosphonium hydroxide, ethoxybenzyltriphenylphosphonium hydroxide, methoxymethyltriphenylphosphonium hydroxide, acetoxymethyltriphenylphosphonium hydroxide, phenacyltriphenylphosphonium hydroxide, chloromethyltriphenylphosphonium hydroxide, bromomethyltriphenyphosphonium hydroxide, biphenyl triphenylphosphonium hydroxide, naphtyltriphenylphosphonium hydroxide, chlorophenyltriphenylphosphonium hydroxide, phenoxyphenyltriphenylphosphonium hydroxide, methoxyphenyltriphenylphosphonium hydroxide, acetoxyphenyltriphenylphosphonium hydroxide, naphtylphenyltriphenylphosphonium hydroxide, etc.;

Mono(aryl)trialkylphosphonium hydroxides, such as phenyltrimethylphosphonium hydroxide, biphenyltrimethylphosphonium hydroxide, phenyltrihexylphosphonium hydroxide, biphenyltrihexylphosphonium hydroxide, etc.

Diaryldialkylphosphonium hydroxides, such as dimethyldiphenylphosphonium hydroxide, diethyldiphenylphosphonium hydroxide, di(biphenyl)diphenylphosphonium hydroxide, etc.;

Tetraarylphosphonium tetraphenyl borates, such as tetraphenylphosphonium tetraphenyl borate, tetranaphthylphosphonium tetraphenyl borate, tetra(chlorophenyl)phosphonium tetraphenyl borate, tetra(biphenyl)phosphonium tetraphenyl borate, tetratolylphosphonium tetraphenyl borate, etc.;

Mono(aryl or alkyl)triphenylphosphonium tetraphenyl borates, such as methyltriphenylphosphonium tetraphenyl borate, ethyltriphenylphosphonium tetraphenyl borate, propyltriphenylphosphonium tetraphenyl borate, butyltriphenylphosphonium tetraphenyl borate, octyltriphenylphosphonium tetraphenyl borate, tetradecyltriphenylphosphonium tetraphenyl borate, benzyltriphenylphosphonium tetraphenyl borate, ethoxybenzyltriphenylphosphonium tetraphenyl borate, methoxymethyltriphenylphosphonium tetraphenyl borate, acetoxymethyltriphenylphosphonium tetraphenyl borate, phenacyltriphenylphosphonium tetraphenyl borate, chloromethyltriphenylphosphonium tetraphenyl borate, bromomethyltriphenylphosphonium tetraphenyl borate, biphenyltriphenylphosphonium tetraphenyl borate, naphtyltriphenylphosphonium tetraphenyl borate, chlorophenyltriphenylphosphonium tetraphenyl borate, phenoxyphenyltriphenylphosphonium tetraphenyl borate, acetoxyphenyltriphenylphosphonium tetraphenyl borate, naphthylphenyltriphenylphosphonium tetraphenyl borate, etc.;

Monoaryltrialkylphosphonium tetraphenyl borates, such as phenyltrimethylphosphonium tetraphenyl borate, biphenyltrimethylphosphonium tetraphenyl borate, phenyltrihexylphosphonium tetraphenyl borate, biphenyltrihexylphosphonium tetraphenyl borate, etc.;

Diaryldialkylphosphonium tetraphenyl borates, such as dimethyldiphenylphosphonium tetraphenyl borate, diethyldiphenylphosphonium tetraphenyl borate, di(biphenyl)diphenylphosphonium tetraphenyl borate, etc.

In these quaternary phosphonium salts, the counter anion of hydroxide or tetraphenyl borate may be replaced with an aryloxy group such as phenoxide, an alkyloxy group such as methoxide or ethoxide, an alkylcarbonyloxy group such as acetate, an arylcarbonyloxy group such as benzoate, or a halogen atom such as chloride or bromide.

Apart from the compounds of formula (XI) mentioned above, also employable herein are compounds of formula (XII) having a di-valent counter anion. They include, for example, quaternary phosphonium salts such as bis(tetraphenylphosphonium) carbonate, bis (biphenyltriphenylphosphonium) carbonate, as well as bis-tetraphenylphosphonium 2,2-bis(4-hydroxyphenyl)propane, ethylenebis(triphenylphosphonium) dibromide, trimethylenebis(triphenylphosphonium) bis(tetraphenyl borate), etc.

In addition, further employable herein are compounds of the following general formulae (XIII) and (XIV):

$$((R^{15}-Ph)_n-PPh_{(4-n)})^+(X^3)^- \quad (XIII)$$
$$((R^{15}-Ph)_n-PPh_{(4-n)})_2^+(Y^2)^{2-} \quad (XIV)$$

In these formulae (XIII) and (XIV), n indicates an integer of from 1 to 4; $R^{15}$ represents an organic group, and plural $R^{15}$'s, if any, may be the same or different; $X^3$ represents a halogen atom, a hydroxyl group, an alkyloxy group, an aryloxy group, an alkylcarbonyloxy group, an arylcarbonyloxy group, $HCO_3$, or $BR_4$ (in which R represents a hydrogen atom or a hydrocarbon group, and four R's may be the same or different); and Ph represents a phenyl group; $Y^2$ represents $CO_3$.

Examples of those quaternary phosphonium compounds are tetraphenylphosphonium hydroxide, biphenyltriphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium tetraphenyl borate, biphenyltriphenylphosphonium tetraphenyl borate, methoxyphenyltriphenylphosphonium tetraphenyl borate, phenoxyphenyltriphenylphosphonium tetraphenyl borate, naphthylphenyltriphenylphosphonium tetraphenyl borate, tetraphenylphosphonium phenoxide, biphenyltriphenylphosphonium phenoxide, methoxyphenyltriphenylphosphonium phenoxide, phenoxyphenyltriphenylphosphonium phenoxide, naphthylphenyltriphenylphosphonium phenoxide, tetraphenylphosphonium chloride, biphenyltriphenylphosphonium chloride, methoxyphenyltriphenylphosphonium chloride, phenoxyphenyltriphenylphosphonium chloride, naphthylphenyltriphenylphosphonium chloride, etc. Of those quaternary phosphonium salts, preferred is tetraphenylphosphonium tetraphenyl borate, since its catalytic activity and the quality of the polycarbonates produced are well balanced.

Examples of the branched alkyl-having quaternary phosphoniums are isopropyltrimethylphopshonium, isopropyltriethylphosphonium, isopropyltributylphosphonium, isopropyltriphenylphosphonium, tetraisopropylphosphonium, cyclohexyltriethylphosphonium, cyclohexyltrimethylphosphonium, cyclohexyltributylphosphonium, cyclohexyltriphenylphosphonium, tetracyclohexylphosphonium, 1,1,1-triphenylmethyltrimethylphosphonium, 1,1,1-triphenylmethyltriethylphosphonium, 1,1,1-triphenylmethyltributylphosphonium, 1,1,1-triphenylmethyltriphenylphosphonium, etc.

Examples of the counter anion of $X^3$ are hydroxide, borohydride, tetraphenyl borate, acetate, propionate, fluoride, chloride, hydrocarbonate, etc.

One example of $Y^2$ is carbonate.

The salts composed of a branched alkyl-having quaternary phosphonium (cation) and $X^3$ or $Y^2$ (anion) include various combinations of the examples mentioned above. For example, they are isopropyltrimethylphosphonium hydroxide, cyclohexyltriphenylphosphonium chloride, 1,1,1-triphenylmethyltriethylphosphonium acetate, bis(isopropyltriethylphosphonium)carbonate, etc.

Of those branched alkyl-having quaternary phosphonium salts, especially preferred are cyclohexyltriphenylphosphonium tetraphenyl borate and cyclopentyltriphenylphosphonium tetraphenyl borate, since their catalytic activity and the quality of the polycarbonates produced are well balanced.

Other examples of the branched alkyl-having quaternary phosphonium salts are carboxylates such as tetramethylphosphonium acetate, tetraethylphosphonium acetate, tetrapropylphosphonium acetate, tetrabutylphosphonium acetate, tetrapentylphosphonium acetate, tetrahexylphosphonium acetate, tetraheptylphosphonium acetate, tetraoctylphosphonium acetate, tetradecylphosphonium acetate, tetradodecylphosphonium acetate, tetratolylphosphonium acetate, tetraphenylphosphonium acetate, tetramethylphosphonium benzoate, tetraethylphosphonium benzoate, tetrapropylphosphonium benzoate, tetraphenylphosphonium benzoate, tetramethylphosphonium formate, tetraethylphosphonium formate, tetrapropylphosphonium. formate, tetraphenylphosphonium formate, tetramethylphosphonium propionate, tetraethylphosphonium propionate, tetrapropylphosphonium propionate, tetramethylphosphonium butyrate, tetraethylphosphonium butyrate, tetrapropylphosphonium butyrate, etc.

It is desirable that the amount of metallic impurities in the quaternary phosphonium salts for use in the invention is as small as possible. Especially preferably, the amount of alkali metal and alkaline earth metal compounds in those salts is not larger than 50 ppm.

It is also desirable that the amount of the quaternary phosphonium salt to be used falls between $10^{-2}$ and $10^{-8}$ mols, relative to one mol of the starting dihydroxy compound. If the amount of the quaternary phosphonium salt used is smaller than $10^{-8}$ mols, the activity of the catalyst will be not enough in the latter stage of the reaction; but if larger than $10^{-2}$ mols, it is unfavorable as increasing the production costs.

(4) Step of Polymerizing Oligocarbonate

<1> Melt-phase Polymerization

In the invention, the reaction temperature at which the oligocarbonates prepared in the previous step are transesterified into polycarbonates may fall generally between 100° C. and 330° C., but preferably between 130° C. and 300° C. If the reaction temperature is lower than 100° C., the reaction speed will be low; but if higher than 330° C., it is problematic in that it causes side reactions and that the polycarbonates produced will be yellowed.

The reaction pressure shall be determined, depending on the monomer vapor pressure and the reaction temperature. For ensuring good reaction, the reaction system is kept under atmospheric pressure (normal pressure) or increased pressure falling between 1 and 50 atms (760 and 38000 Torr) in the initial stage of the reaction, and is then kept under reduced pressure in the latter stage thereof. Preferably, it is kept under a reduced pressure of from 0.01 to 100 Torr in the final stage of the reaction.

For the reaction time, the reaction shall be continued until the product can have the intended increased molecular weight. In general, the reaction time falls between 0.2 and 10 hours or so.

The transesterification is generally effected in the presence of an inert solvent. If desired, from 1 to 150% by weight, relative to the polycarbonate to be produced, of an inert solvent may be used in the transesterification. The inert solvent includes, for example, aromatic compounds such as diphenyl ether, halogenodiphenyl ethers, benzophenone, polyphenyl ether, dichlorobenzene, methylnaphthalene, etc.; gases such as carbon dioxide, dinitrogen monoxide, nitrogen, etc.; chlorofluorohydrocarbons; alkanes such as ethane, propane, etc.; cycloalkanes such as cyclohexane, tricyclo(5.2.10)decane, cyclooctane, cyclodecane, etc.; alkenes such as ethene, propene, etc.

Crystallization of Oligocarbonate

In case where the oligocarbonate is polymerized in a swollen state or in a solid-phase state, it is crystallized before it is polymerized, as so mentioned hereinabove.

The method of crystallizing the oligocarbonate is not specifically defined, for which, however, preferred is solvent treatment or thermal crystallization. In the former method of solvent treatment, the oligocarbonate is crystallized in a solvent of, for example, chloromethane, methylene chloride or chloroform. The amount of the solvent to be used varies, depending on various conditions. Preferably, however, it falls between 0.05 and 100 times, more preferably between 0.1 and 50 times by weight of the oligocarbonate.

In the latter method of thermal crystallization, the oligocarbonate is heated up to a temperature not lower than the glass transition point of the aromatic polycarbonate to be produced from it but lower than the melting point of the oligocarbonate, to thereby crystallize it.

For crystallizing the oligocarbonate, any known method is employable, including, for example, rolling granulation, extrusion granulation, compression granulation, melt granulation, spray-drying granulation, fluidized bed granulation, milling granulation, XXX granulation, liquid-phase granulation, vacuum drying granulation, etc.

The morphology of the crystallized oligocarbonate flakes is not specifically defined. In view of their handlability, preferred are pellets and beads. For these, effective is a method of stirring granulation that comprises dissolving the oligocarbonate in a swelling solvent to be used in the next step, and flaking it therein with a bad solvent being added thereto. For polymerizing them, the flakes do not require drying.

<2> Solid-phase Polymerization

The crystallized solid oligocarbonate is polymerized in the presence of the above-mentioned quaternary phosphonium salt serving as a catalyst. In this case, the side products, aromatic monohydroxy compound and/or diaryl carbonate are removed from the reaction system, whereby the reaction is accelerated. For this, for example, preferably employed is a method of introducing an inert gas such as nitrogen, argon, helium, carbon dioxide or the like, or a hydrocarbon gas or a bad solvent gas into the reaction system to thereby remove the side products together with the gas, a method of effecting the reaction under reduced pressure, or a combination of the two. In the method of introducing the gas for accompanying the side products, it is desirable that the gas is pre-heated at a temperature near to the reaction temperature.

For the condition of the bad solvent usable herein, the solubility of the final product, polycarbonate in the solvent shall be at most 0.1% by weight under the reaction condition mentioned below, and the solvent shall have little influence on the reaction. Preferably, the bad solvent is a linear or branched, saturated hydrocarbon compound having from 4 to 18 carbon atom, or an unsaturated hydrocarbon compound having from 4 to 18 carbon atoms in which the degree of unsaturation is low. Its boiling point is preferably not higher than 250° C. If higher than 250° C., the remaining solvent will be difficult to remove, and the quality of the product will be poor.

The morphology of the crystallized oligocarbonate to be subjected to solid-phase polymerization is not specifically defined, but it is preferably in the form of pellets or beads.

The reaction catalyst for the solid-phase polymerization is preferably a quaternary phosphonium salt such as that mentioned hereinabove, but may be any other catalyst. The catalyst having been added to the system in the previous step of preparing the oligocarbonate and still remaining therein could act, as it would be, also in the step of solid-phase polymerization, or the catalyst mentioned above may be added to the system. The additional catalyst may be powder, liquid or gaseous.

The reaction temperature, $Tp$ (° C.), and the reaction time for the solid-phase polymerization shall vary, depending on the type (including the chemical structure and the molecular weight) and the morphology of the crystallized oligocarbonate, the presence or absence of the catalyst in the crystallized oligocarbonate, the type and the amount of the catalyst therein, the type and the amount of the optional catalyst, the degree of crystallization of the crystallized oligomer, the melting point $Tm'$ (° C.) of the crystallized oligomer, the necessary degree of polymerization of the intended final product, aromatic polycarbonate, and other reaction conditions. Concretely, it is desirable that the oligocarbonate is polymerized in a solid phase while being heated at a temperature not lower than the glass transition point of the intended final product, aromatic polycarbonate and falling within a range within which the crystallized oligomer being polymerized does not melt but could be all the time in a solid phase, more preferably falling within the range to be indicated by the following formula:

$$Tm'-50 \leq Tp < Tm' \qquad (XV),$$

for 1 minute to 100 hours, more preferably for 0.1 to 50 hours or so.

For example, when a polycarbonate of bisphenol A is produced, the temperature range is preferably from about 150 to 260° C., more preferably from about 180 to 245° C.

In the polymerization step, the system is preferably agitated in order that the oligocarbonate being polymerized could be heated as uniformly as possible and that the side products could be removed from the system as smoothly as possible. For this, for example, the system is stirred, or the reactor is rotated, or the system is fluidized with hot gas.

In general, aromatic polycarbonates favorable to industrial use have a weight-average molecular weight of from 6000 to 200000 or so. In the solid-phase polymerization step as herein, polycarbonates having a degree of polymerization within that range are easy to produce.

The degree of crystallization of the aromatic polycarbonate to be obtained through the solid-phase polymerization of the crystallized oligocarbonate is generally larger than that of the starting oligocarbonate. Therefore, the product obtained in the method of the invention is generally a crystalline, aromatic polycarbonate powder. The crystalline aromatic polycarbonate powder thus produced could be directly pelletized in an extruder, without being cooled, or could be directly molded in a molding machine also without being cooled.

The ratio of the degree of prepolymerization which has some influence on the subsequent polymerization, to that of solid-phase polymerization may be varied in any desired range.

<3> Swollen Solid-phase Polymerization

This is to further polymerize the oligocarbonate that has been crystallized in the previous step, in a solid phase swollen with a swelling gas mentioned below. The method is for producing a polycarbonate through transesterification of the oligocarbonate in such a swollen solid phase, and its advantage is that the side products, low molecular compounds such as phenol and others, can be more readily degassed or extracted away from the polymers (in the invention, oligocarbonate and/or polycarbonate) that are swollen with a swelling solvent gas than from high-viscosity polymer melts or from crystallized solid polymers, as the substance mobility rate is higher in the former swollen solid-phase system, therefore ensuring a higher reaction rate therein.

The swelling solvent (swelling solvent gas) to be used in the method is meant to include single solvents capable of swelling polycarbonates by themselves under the reaction condition below; mixtures of two or more such solvents; and mixtures to be prepared by adding one or more bad solvents to the single solvents or their mixtures. The swollen condition in this step is meant to indicate that the starting oligocarbonate flakes are swollen by volume or weight at least to a degree not lower than the thermal swell thereof under the reaction condition mentioned below. The swelling solvent is a single compound having a boiling point at which it can completely vaporize within the range of the following reaction condition or having a vapor pressure of generally not lower than 50 mmHg under that reaction condition, or a mixture of such compounds, and it can form the swollen condition defined above.

The swelling solvent is not specifically defined, so far as it satisfies the swelling condition noted above. For example, aromatic compounds and oxygen-containing compounds having a solubility parameter of generally from 4 to 20 $(cal/cm^3)^{1/2}$, preferably 7 to 14 $(cal/cm^3)^{1/2}$ belong to the category of the swelling solvent.

The swelling solvent includes, for example, aromatic hydrocarbons such as benzene, toluene, xylene, ethylbenzene, diethylbenzene, propylbenzene, dipropylbenzene, etc.; ethers such as tetrahydrofuran, dioxane, etc.; ketones such as methyl ethyl ketone, methyl isobutyl ketone, etc. Of those, preferred are single compounds of aromatic hydrocarbons having from 6 to 20 carbon atoms, and their mixtures.

Regarding its condition, the bad solvent to be mixed with the swelling solvent shall be such that the solubility of the product, polycarbonate in it is at most 0.1% by weight under the reaction condition mentioned below and that it participates little in the reaction. Preferred examples of the bad solvent are linear or branched, saturated hydrocarbon compounds having from 4 to 18 carbon atoms, or low-unsaturated hydrocarbon compounds having from 4 to 18 carbon atoms. If the boiling point of the swelling solvent and that of the bad solvent are both above 250° C., the residual solvents will be difficult to remove from the product, polycarbonate, and the quality of the product will be poor.

In case where a mixture of such a bad solvent and the swelling solvent is used herein, the proportion of the swelling solvent shall be at least 1% by weight of the mixed solvent, but preferably at least 5% by weight thereof.

In the swollen solid-phase polymerization step, the reaction temperature preferably falls between 100 and 240° C., and the reaction pressure preferably falls between 10 Torr and 5 kg/cm²G, but is more preferably not higher than atmospheric pressure. If the reaction temperature is lower than the defined range, the oligocarbonate could not undergo transesterification. On the other hand, however, if the reaction is effected at high-temperature conditions exceeding the melting point of the oligomer, the reaction system could not keep a solid phase, and the oligomer grains will fuse together at such high temperatures. If so, the operability to continue the reaction will be greatly lowered. Therefore, the reaction temperature must not be higher than the melting point of the oligocarbonate.

For the reaction catalyst in the swollen solid-phase polymerization step, preferably used is a quaternary phosphonium salt such as that mentioned hereinabove, and optionally any other catalyst. The reaction catalyst having been added to the system in the previous step of preparing the oligocarbonate, and still remaining in the oligocarbonate thus prepared could act, as it would be, further in the swollen solid-phase polymerization step, but, as the case may be, an additional catalyst such as that mentioned above may be added to the swollen solid-phase polymerization system. The additional catalyst may be powdery, liquid or gaseous.

Regarding the mode of feeding the swelling solvent gas into the polymerization system, the liquid solvent may be directly fed into the reactor and is vaporized therein; or the liquid solvent is, after having been previously vaporized by the use of a heat exchanger or the like, fed into the reactor. The amount of the swelling gas to be fed into the reactor is preferably at least 0.5 liters (ground state)/hr/g of the oligomer. The flow rate of the swelling gas solvent is closely related with the reaction rate. The swelling gas solvent acts to remove phenols and serves as a heat medium, and the reaction rate increases with the increase in the gas flow rate. The reactor to be used for the swollen solid-phase polymerization is not specifically defined.

<4> Thin Film Melt-phase Polymerization

This is for polymerizing the oligocarbonate having been prepared in the previous step to produce a polycarbonate having an increased molecular weight, and it comprises putting the oligocarbonate into a polymerization reactor equipped with heating, pressure-reducing and melt film-forming units, melting and forming it into a thin film by driving the pressure-reducing unit, and increasing its molecular weight to produce the intended polycarbonate having an increased molecular weight. This method is referred to as a thin-film polymerization method. In the method, the transesterification of the oligocarbonate is much promoted to give the intended polycarbonate having an increased molecular weight. In this, therefore, the oligocarbonate in. melt forms a thin melt film having a thickness of at most 5 mm, preferably at most 3 mm, more preferably at most 1 mm in the presence of a catalyst such as the above-mentioned quaternary phosphonium salt or the like, and undergoes transesterification at a reaction temperature falling between 50 and 320° C., preferably between 100 and 320° C., more preferably between 150 and 280° C., under a reaction pressure falling between 0.1 Torr and 5 kg/cm²G, for a reaction period of time falling between 1 minute and 100 hours, preferably between 2 and 20 hours.

Forming the thin melt film of the oligocarbonate is not specifically defined. For example, the oligocarbonate is dissolved in a solvent such as that mentioned hereinabove in the section of (4) solvent in the part of <1> step of preparing oligocarbonates, then the resulting solution is spread over the bottom of a reactor having a broad bottom area, and the solvent is evaporated away under heat to give a thin melt film of the oligocarbonate. The solvent is preferably a halogenohydrocarbon.

The thin-film polymerization method is one particular method of known melt transesterification methods, and it is targeted to accelerating phenol vapor removal to promote the reaction. Another advantage of the method is that the polycarbonates produced are prevented as much as possible from being degraded by the released phenol to thereby attain the object of the invention which is to reduce the impurities in the polycarbonates produced.

The invention is described in detail with reference to the following Examples and Comparative Examples, which, however, are not intended to restrict the scope of the invention.

EXAMPLE 1

22.8 g (0.1 mols) of a starting aromatic hydroxy compound, bisphenol A; 2.22 mg of palladium chloride (molecular weight: 177.31, 12.5 μmols) and 23.8 mg of cerium acetate monohydrate (molecular weight: 317.26, 75 μmols) serving as an oxidative carbonylation catalyst; and 0.12 mg of tetrabutylammonium bromide (molecular weight: 322.38, 375 μmols) serving as a co-catalyst were sealed in a 30-ml autoclave equipped with a stirrer. Carbon monoxide was introduced into the autoclave under pressure with degassing it, whereby the autoclave was purged with carbon monoxide. Next, carbon monoxide was further introduced thereinto to have an increased partial pressure of 6.0 MPa at 25° C., and then air was introduced thereinto under pressure so that the total pressure in the autoclave could be 7.5 MPa. With that, the autoclave was heated at 100° C. at which the compounds therein were reacted for 48 hours.

After the reaction therein, the autoclave was cooled and degassed, and 60 ml of methylene chloride was added thereto to prepare an oligomer (oligocarbonate) solution. To the resulting oligomer solution, added were 0.0066 g (10 μmols) of a solid-phase polymerization catalyst, cyclohexyltriphenylphosphonium tetraphenyl borate and 0.86 g (0.004 mols) of a terminator, diphenyl carbonate; and acetone for crystallization was added thereto up to its cloud point. Then, this was concentrated to dryness with an evaporator, and further dried in vacuum to obtain a powder of the oligomer. The viscosity-average molecular weight of the thus-obtained oligomer was 5400. 20 g of the powder was put into a SUS tube having a diameter of 58 mm and a length of 170 mm, and a flow gas of nitrogen was led thereinto at a flow rate of 100 ml/min. In that condition, this was heated from room temperature up to 240° C. for 2 hours for solid-phase polymerization to produce a polycarbonate. The viscosity-average molecular weight of the resulting polycarbonate is shown in Table 1.

EXAMPLE 2

A polycarbonate was produced in the same manner as in Example 1, for which, however, heptane gas and not nitrogen gas was used in the step of solid-phase polymerization. The viscosity-average molecular weight of the oligomer before solid-phase polymerization and that of the polycarbonate produced are shown in Table 1.

EXAMPLE 3

A polycarbonate was produced in the same manner as in Example 1, for which, however, a swelling solvent gas of paraxylene and not nitrogen gas was used in the step of solid-phase polymerization. The viscosity-average molecular weight of the oligomer before solid-phase polymerization and that of the polycarbonate produced are shown in Table 1.

EXAMPLES 4 AND 5

Polycarbonates were produced in the same manner as in Example 1, for which, however, 0.004 mols of the monophenol shown in Table 1 was used as a part of the starting aromatic hydroxy compound and the terminator was not used. The viscosity-average molecular weight of the oligomers before solid-phase polymerization and that of the polycarbonates produced are shown in Table 1.

EXAMPLE 6

A polycarbonate was produced in the same manner as in Example 1, for which, however, the terminator was not used. The viscosity-average molecular weight of the oligomer before solid-phase polymerization and that of the polycarbonate produced are shown in Table 1.

EXAMPLE 7

22.8 g (0.1 mols) of a starting aromatic hydroxy compound, bisphenol A; 2.22 mg of palladium chloride (molecular weight: 177.31, 12.5 μmols) and 23.8 mg of cerium acetate monohydrate (molecular weight: 317.26, 75 μmols) serving as an oxidative carbonylation catalyst; and 0.12 mg of tetrabutylammonium bromide (molecular weight: 322.38, 375 μmols) serving as a co-catalyst were sealed in a 30-ml autoclave equipped with a stirrer. Carbon monoxide was introduced into the autoclave under pressure with degassing it, whereby the autoclave was purged with carbon monoxide. Next, carbon monoxide was further introduced thereinto to have an increased partial pressure of 6.0 MPa at 25° C., and then air was introduced thereinto under pressure so that the total pressure in the autoclave could be 7.5 MPa. With that, the autoclave was heated at 100° C. at which the compounds therein were reacted for 48 hours.

After the reaction therein, the autoclave was cooled and degassed, and the solid product therein was scraped out. The viscosity-average molecular weight of the oligomer (oligocarbonate) in the solid was 5100. About 25 g of the thus-prepared oligomer, 0.86 g (0.004 mols) of a terminator, diphenyl carbonate, and 0.0066 g (10 μmols) of a melt-polymerization catalyst, tetraphenylphosphonium tetraphenyl borate were put into a 100-ml separable flask of nickel equipped with a stirrer, and the pressure in the flask was reduced and then restored with a flow gas of nitrogen. The pressure cycle was repeated 5 times in all to thereby purge the flask with nitrogen. Next, this was heated from room temperature up to 270° C., with the pressure therein being reduced to at most 0.5 Torr. Thus heated, the oligomer was polymerized in melt for 2 hours to produce a polycarbonate. The viscosity-average molecular weight of the resulting polycarbonate is shown in Table 1.

EXAMPLE 8

22.8 g (0.1 mols) of a starting aromatic hydroxy compound, bisphenol A; 2.22 mg of palladium chloride (molecular weight: 177.31, 12.5 μmols) and 23.8 mg of cerium acetate monohydrate (molecular weight: 317.26, 75 μmols) serving as an oxidative carbonylation catalyst; and 0.12 mg of tetrabutylammonium bromide (molecular weight: 322.38, 375 μmols) serving as a co-catalyst were sealed in a 30-ml autoclave equipped with a stirrer. Carbon monoxide was introduced into the autoclave under pressure with degassing it, whereby the autoclave was purged with carbon monoxide. Next, carbon monoxide was further introduced thereinto to have an increased partial pressure of 6.0 MPa at 25° C., and then air was introduced thereinto under pressure so that the total pressure in the autoclave could be 7.5 MPa. With that, the autoclave was heated at 100° C. at which the compounds therein were reacted for 48 hours.

After the reaction therein, the autoclave was cooled and degassed, and the solid product therein was scraped out. The viscosity-average molecular weight of the oligomer (oligocarbonate) in the solid was 5200. About 8.04 g of the thus-prepared oligomer, 0.86 g (0.004 mols) of a terminator, diphenyl carbonate, and 0.0022 g (3.3 μmols) of a polymerization catalyst, tetraphenylphosphonium tetraphenyl borate were put into a laboratory dish having a diameter of 32 mm, to which was added 10 ml of methylene chloride. In the dish, the oligomer and the catalyst were dissolved and mixed. Next, methylene chloride was evaporated away, and a thin film having a thickness of 0.01 cm was thus formed in the dish. This was dried in vacuum at 120° C. overnight. Next, this was polymerized in a reduced-pressure oven equipped with a hot plate, at 270° C. under 0.5 Torr for 2 hours to produce a polycarbonate. The viscosity-average molecular weight of the resulting polycarbonate is shown in Table 1.

TABLE 1

| Example | Dihydroxy Compound | Monophenol | Oxidative Carbonylation Catalyst | Terminator | Mv of Oligomer | Method of Oligomer Polymerization | Polymerization Catalyst | Mv of Polycarbonate |
|---|---|---|---|---|---|---|---|---|
| 1 | Bisphenol A | no | palladium chloride, cerium acetate monohydrate, tetrabutyl-ammonium bromide | diphenyl carbonate | 5400 | solid-phase polymerization | cyclohexyl-triphenyl-phosphonium tetraphenyl borate | 34000 |
| 2 | same as in Example 1 | no | Same as in Example 1 | same as in Example 1 | 5000 | solid-phase polymerization | same as in Example 1 | 31200 |
| 3 | same as in Example 1 | no | Same as in Example 1 | same as in Example 1 | 5100 | swollen solid-phase polymerization | same as in Example 1 | 30400 |
| 4 | same as in Example 1 | phenol | Same as in Example 1 | no | 3800 | solid-phase polymerization | same as in Example 1 | 20600 |
| 5 | same as in Example 1 | p-cumyl-phenol | Same as in Example 1 | no | 4000 | solid-phase polymerization | same as in Example 1 | 20100 |
| 6 | same as in Example 1 | no | Same as in Example 1 | no | 4900 | solid-phase polymerization | same as in Example 1 | 19000 |
| 7 | same as in Example 1 | no | Same as in Example 1 | same as in Example 1 | 5100 | melt polymerization | tetraphenyl-phosphonium tetraphenyl borate | 20600 |
| 8 | same as in Example 1 | no | Same as in Example 1 | same as in Example 1 | 5200 | thin-film melt polymerization | same as in Example 1 | 22400 |

INDUSTRIAL APPLICABILITY

As described in detail hereinabove, the method for producing polycarbonates of the invention comprises preparing oligomers through oxidative carbonylation of an aromatic hydroxy compound with carbon monoxide and oxygen followed by increasing the molecular weight of the oligomers through transesterification to produce polycarbonates having an increased molecular weight. As comprising such a few steps, the production method is economical, and it enables production of high-quality polycarbonates having a high degree of polymerization and therefore having an increased molecular weight.

What is claimed is:

1. A method for producing polycarbonates, which comprises preparing oligocarbonates through oxidative carbonylation of an aromatic hydroxy compound with carbon monoxide and oxygen followed by increasing the molecular weight of the oligocarbonates through transesterification to produce polycarbonates having an increased molecular weight.

2. The method for producing polycarbonates as claimed in claim 1, wherein the oligocarbonates are crystallized and then polymerized through swollen-phase or solid-phase transesterification into polycarbonates having an increased molecular weight.

3. The method for producing polycarbonates as claimed in claim 1, wherein the oligocarbonates are polymerized through melt-phase transesterification into polycarbonates having an increased molecular weight.

4. The method for producing polycarbonates as claimed in claim 1, wherein the catalyst for oxidative carbonylation comprises (a) a palladium compound and (b) a redox compound.

5. The method for producing polycarbonates as claimed in claim 1, wherein the aromatic hydroxy compound is a dihydroxy compound, or a mixture of a dihydroxy compound and a monophenol.

* * * * *